United States Patent
Tanimura

(10) Patent No.: US 6,832,602 B2
(45) Date of Patent: Dec. 21, 2004

(54) FUEL SUPPLY SYSTEM WITH TRANSFER PUMP AND FUEL SUPPLY METHOD

(75) Inventor: Naoaki Tanimura, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/261,652

(22) Filed: Oct. 2, 2002

(65) Prior Publication Data

US 2003/0062031 A1 Apr. 3, 2003

(30) Foreign Application Priority Data

Oct. 2, 2001 (JP) ..................................... P2001-306785

(51) Int. Cl.$^7$ ............................................. F02M 37/04
(52) U.S. Cl. ..................................................... 123/509
(58) Field of Search ................................ 123/509, 510; 137/565.22, 574, 147

(56) References Cited

U.S. PATENT DOCUMENTS

| | | | | |
|---|---|---|---|---|
| 4,951,699 A | * | 8/1990 | Lipman | 137/142 |
| 5,040,516 A | * | 8/1991 | Haraguchi | 123/509 |
| 5,078,169 A | * | 1/1992 | Scheurenbrand et al. | 137/574 |
| 5,642,718 A | * | 7/1997 | Nakai et al. | 123/497 |
| 5,732,684 A | * | 3/1998 | Thompson | 123/514 |
| 5,873,349 A | * | 2/1999 | Tuckey et al. | 123/514 |
| 5,979,485 A | * | 11/1999 | Tuckey et al. | 137/143 |
| 6,532,941 B2 | * | 3/2003 | Begley et al. | 123/497 |
| 6,607,005 B2 | * | 8/2003 | Viebahn et al. | 137/574 |

FOREIGN PATENT DOCUMENTS

| | | |
|---|---|---|
| DE | 42 01 037 A1 | 7/1993 |
| DE | 44 26 946 A1 | 2/1996 |
| DE | 101 03 112 A1 | 8/2001 |
| JP | 62-195488 | 8/1987 |
| JP | 2000-257526 | 9/2000 |

* cited by examiner

*Primary Examiner*—Mahmoud Gimie
(74) *Attorney, Agent, or Firm*—McDermott Will & Emery LLP

(57) ABSTRACT

A system and method for supplying fuel to an internal combustion engine is disclosed including a fuel tank 11 having a first fuel sump portion 11a, in which a fuel pump 12 is disposed, and a second fuel sump portion 11b formed separate from the first fuel sump portion 11a. A transfer pump 17 which supplies fuel from the second fuel sump portion 11b to the first fuel sump portion 11a is driven with a traveling energy of divergent fuel forming a portion of fuel to be supplied to the internal combustion engine from the fuel pump 12. A divergent fuel control unit 20 is disposed in a supply line of the diverged fuel to decrease the flow rate of the divergent fuel in dependence on an increase in a demanded fuel flow rate of the internal combustion engine, thereby minimizing a compensation flow rate of the fuel pump 12 as a whole and the flow rate size thereof.

6 Claims, 5 Drawing Sheets

FUEL SUPPLY SYSTEM WITH TRANSFER PUMP AND FUEL SUPPLY METHOD

BACKGROUND OF THE INVENTION

The present invention relates to a fuel supply system equipped with a transfer pump which is driven with a traveling energy of fuel diverged from fuel to be supplied to an internal combustion engine from a fuel pump.

As disclosed in Japanese Patent Provisional Publication No. 2000-257526, various attempts have heretofore been made to provide a saddle fuel tank that straddles a propeller shaft or a fuel tank that incorporates therein a turning reservoir to preclude fuel from being forced to one side due to a centrifugal force created during cornering.

The saddle fuel tank has an inner structure formed in two independent fuel sump portions separate from one another that border the propeller shaft, and is arranged such that fuel is transferred from one fuel sump portion to the other fuel sump portion in which a fuel pump is disposed. Further, with the fuel tank in which the turning reservoir is disposed, an attempt is made to transfer fuel from an exterior of the fuel tank to an interior thereof.

To achieve such fuel transfer, a jet pump is used which draws fuel through the use of a traveling energy (flow speed) of fuel returning to the tank to enable fuel to be transferred without the need for using an extra drive unit such as a motor.

A discharge rate of the fuel pump for fuel to be supplied to the internal combustion engine is designed to vary depending on a demanded fuel flow rate of the internal combustion engine, with the discharged fuel stream partly forming an excess stream of fuel flowing through a pressure regulator or a stream of fuel bypassing from fuel at a feed side and serving as a return fuel stream to be fed back to the fuel tank such that these streams create a drive source for the jet pump previously mentioned.

SUMMARY OF THE INVENTION

However, with such a fuel supply system of the related art, since the jet pump is driven with a stream of a portion of fuel discharged from the fuel pump, a compensation flow rate (flow rate size) of the fuel pump is determined with a sum of the flow rate of fuel consumed with the internal combustion engine and a driving flow rate of the jet pump.

For this reason, in a case where the driving flow rate of the jet pump is formed with feed side fuel, the discharge rate of the fuel pump should include an additional driving flow rate of the jet pump and, hence, the flow rate size of the fuel pump must be increased to an excessively higher level than required.

Further, in a case where an approach is made to use a fuel pump of a variable volume type, since as the demanded fuel flow rate of the internal combustion engine increases, the fuel pressure is raised to cause the injector to atomize fuel in a fine mist or to allow a dynamic range to be increased, a leakage of fuel increases at the high fuel pressure side due to a feed-back of fuel pressure, i.e. the flow rate of return fuel increases, resulting in a need for a further increase in the flow rate size of the fuel pump.

Accordingly, the presence of such an increase in the flow rate size of the fuel pump induces an increase in the electric current necessary for driving the fuel pump with a resultant deterioration in fuel consumption, additionally causing disadvantageous results such as noises or vibrations due to an increased drive force.

It is therefore an object of the present invention to provide a fuel supply system with a transfer pump which enables a fuel pump to have a lowered flow rate size by providing a capability of reducing the flow rate of fuel to be diverged to the transfer pump in accordance with an increase in a demanded fuel flow rate of an internal combustion engine.

According to an aspect of the present invention, there is provided a fuel supply system with a transfer pump, comprising: a fuel pump supplying fuel to an internal combustion engine; a fuel tank having a first fuel sump portion in which the fuel pump is disposed and a second fuel sump portion formed separate from the first fuel sump portion; a transfer pump driven with a traveling energy of divergent fuel diverged from a portion of fuel to be supplied to the internal combustion engine from the fuel pump to transfer fuel from the second sump portion to the first fuel sump portion; and a divergent fuel control unit disposed in a supply line of the divergent fuel to decrease the flow rate of the divergent fuel in dependence on a demanded fuel flow rate of the internal combustion engine.

According to another aspect of the present invention, there is provided a fuel supply system with a transfer pump, comprising: means for supplying fuel to an internal combustion engine; a fuel tank having first fuel sump means in which the fuel supplying means is disposed and second fuel sump means formed separate from the first fuel sump means; fuel transfer means driven with a traveling energy of divergent fuel diverged from a portion of fuel to be supplied to the internal combustion engine from the fuel pump to transfer fuel from the second sump portion to the first fuel sump portion; and divergent fuel control means disposed in a supply line of the divergent fuel to decrease the flow rate of the divergent fuel in dependence on a demanded fuel flow rate of the internal combustion engine.

According to the other aspect of the present invention, there is provided a method for supplying fuel to an internal combustion engine, the method comprising: preparing a fuel pump supplying fuel to an internal combustion engine through a primary fuel passage; preparing a fuel tank having a first fuel sump portion in which the fuel pump is disposed and a second fuel sump portion formed separate from the first fuel sump portion; locating a transfer pump, which is driven with a traveling energy of divergent fuel diverged from a portion of fuel to be supplied to the internal combustion engine from the fuel pump, in a divergent fuel passage connected to the primary fuel passage; allowing the portion of fuel, passing through the primary fuel passage, to flow into the divergent fuel passage to drive the transfer pump for transferring fuel from the second sump portion to the first fuel sump portion; and controlling the degree of fluid communication between the primary passage and the divergent fuel passage to vary the flow rate of divergent fuel in dependence on a demanded fuel flow rate of the internal combustion engine.

DETAILED DESCRIPTION OF THE PREFERRED EMBODIMENTS

Embodiments of the present invention will be described below in detail with reference to the drawings.

(First Embodiment)

Figure 1:
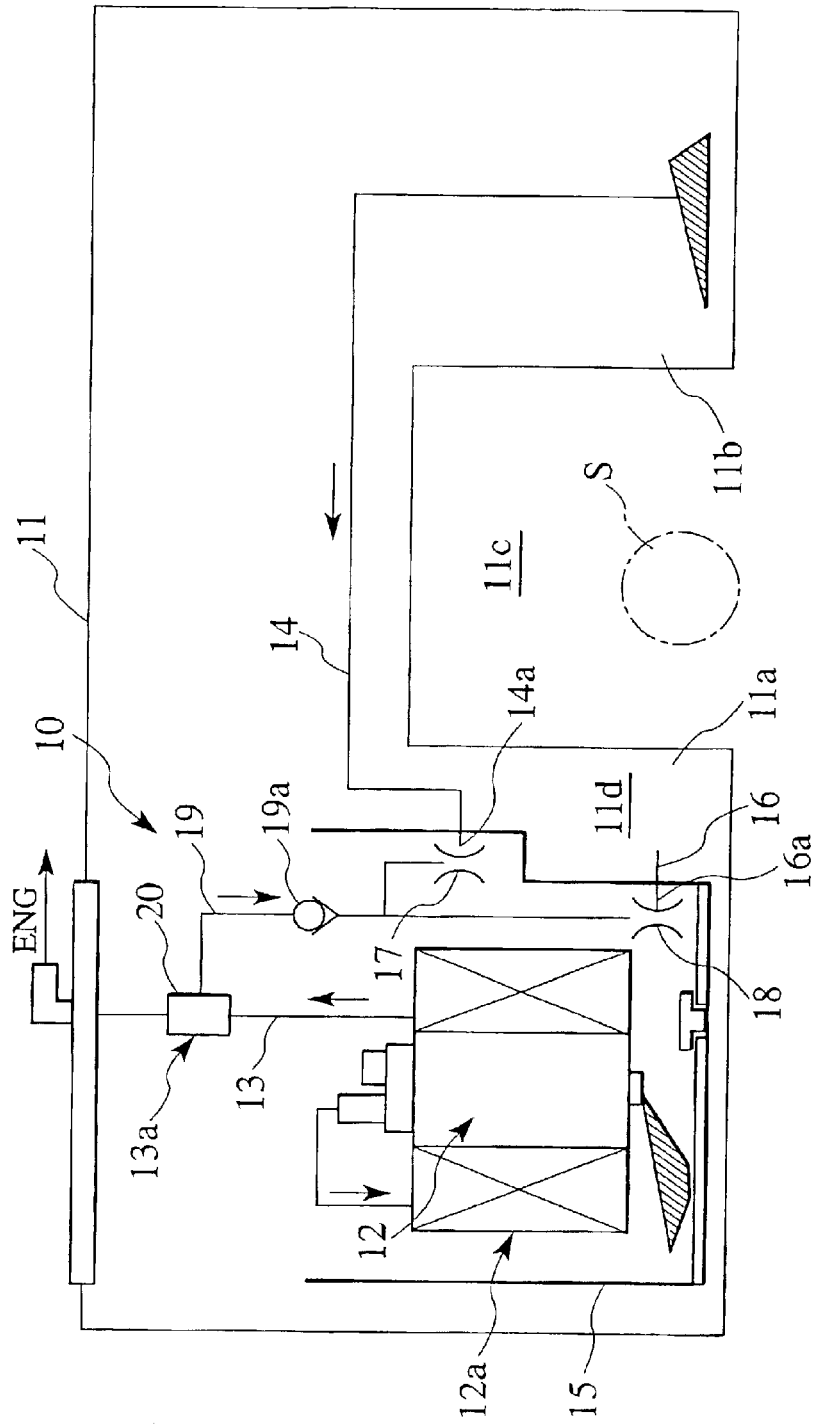
FIG. 1 is a schematic structural view of a fuel supply system of a first embodiment according to the present invention.
Figure 2:
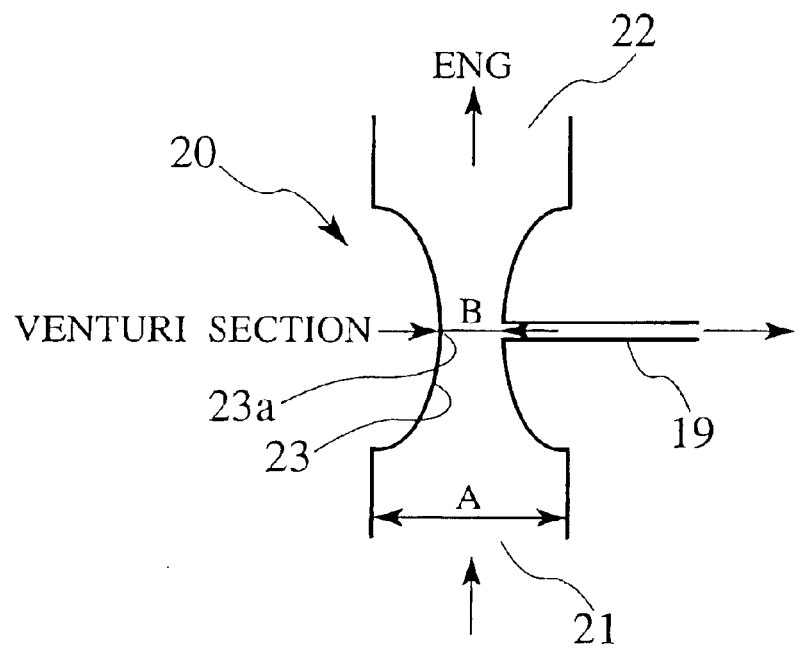
FIG. 2 is an enlarged cross sectional view of a divergent fuel control unit in the first embodiment according to the present invention.
Figure 3:
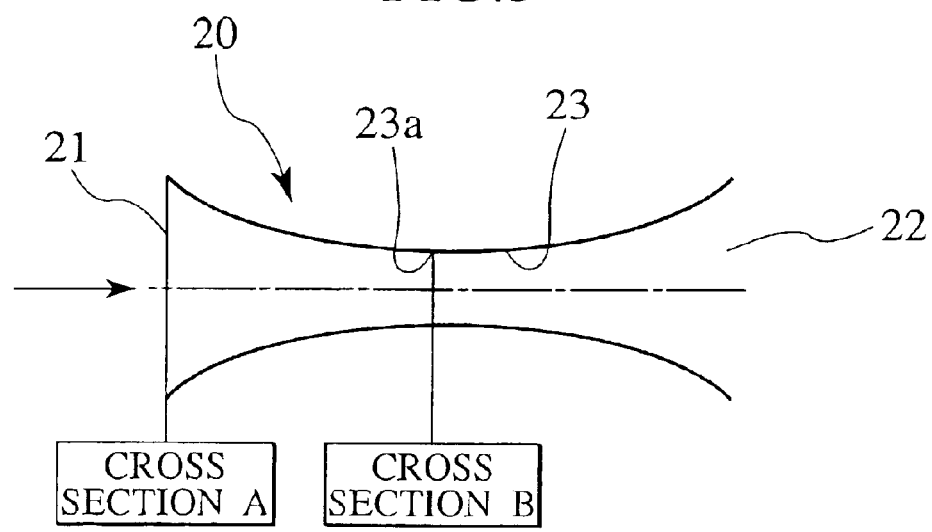
FIG. 3 is a view for illustrating a venturi used as the diverged fuel control unit in the first embodiment according to the present invention.
Figure 4:
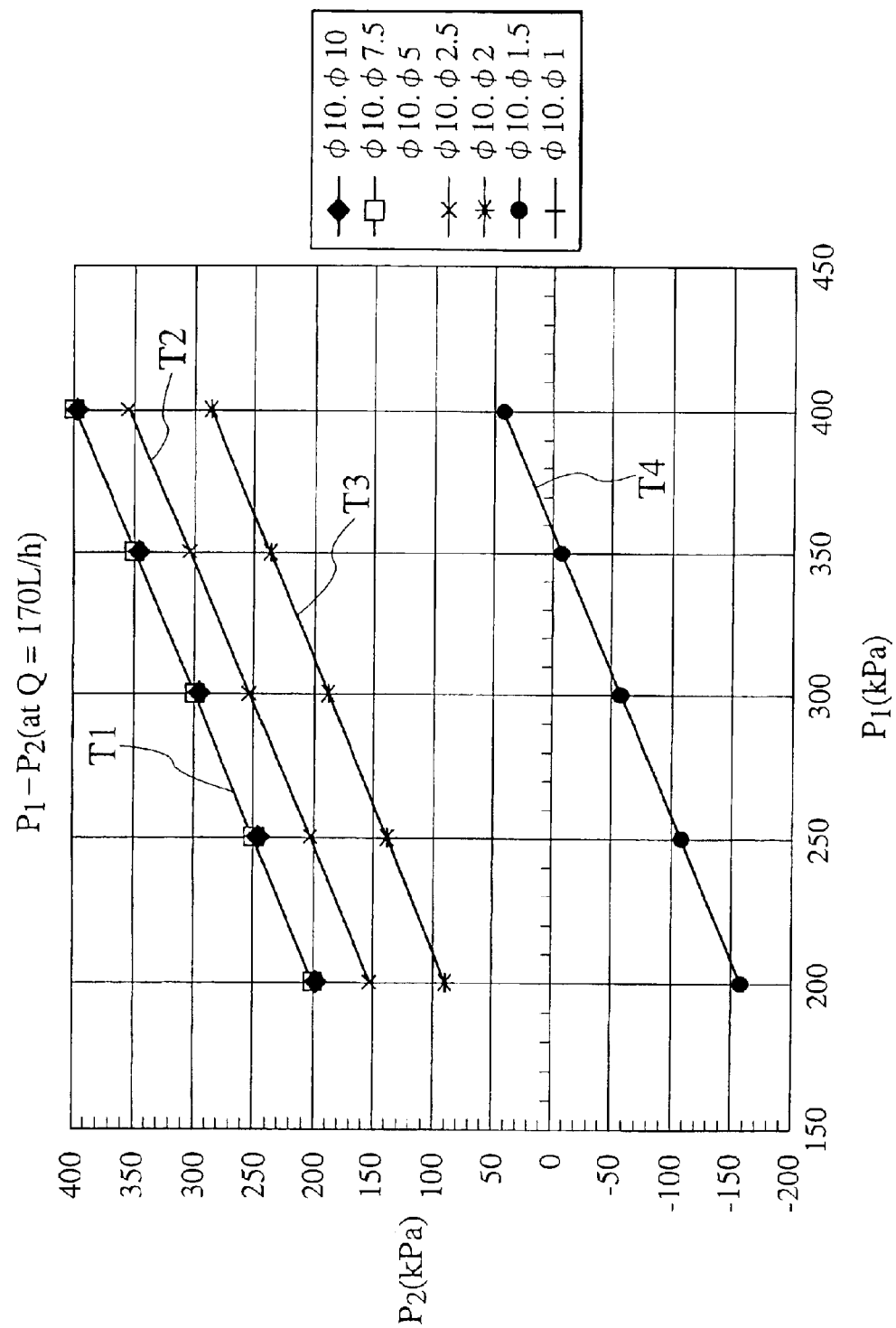
FIG. 4 is a characteristic view for illustrating the relationship between an inlet pressure and a pressure at a constricted portion of the venturi in the first embodiment according to the present invention.
Figure 5:
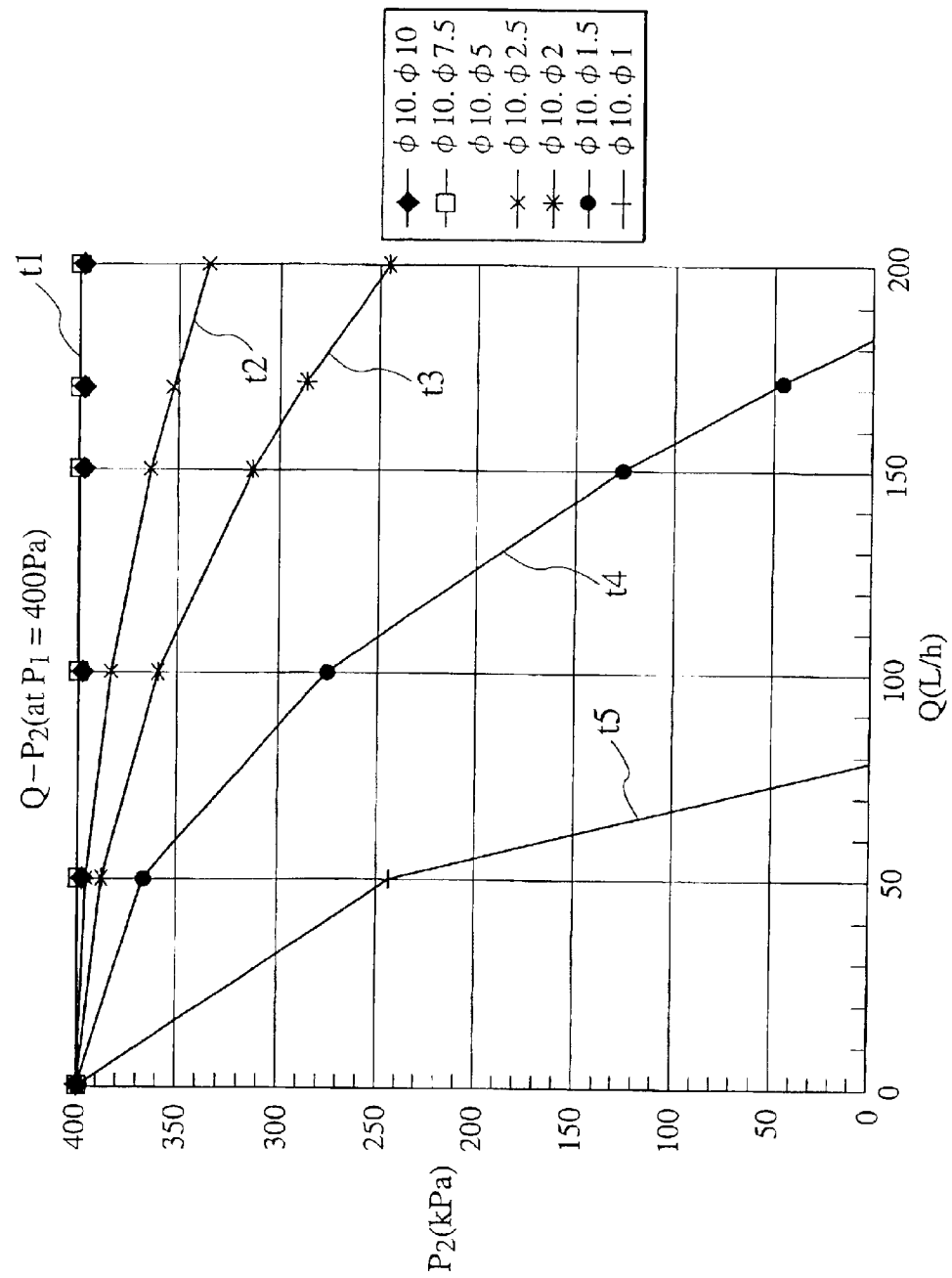
FIG. 5 is a characteristic view for illustrating the relationship of a pressure variation at the constricted portion plotted in terms of the flow rate of introduced fluid of the venturi in the first embodiment according to the present invention.

FIGS. 1 to 5 show a fuel supply system with a transfer pump of a first embodiment according to the present invention, with FIG. 1 being a schematic structural view of the fuel supply system, FIG. 2 being an enlarged cross sectional view of a divergent fuel control unit shown in FIG. 1, FIG. 3 is a view illustrating a venturi used as the divergent fuel control unit shown in FIG. 2, FIG. 4 being a characteristic view showing the relationship between an inlet pressure of the venturi and a pressure at a constricted portion, and FIG. 5 being a characteristic view showing the relationship between pressure variations at the constricted portion in terms of an inlet flow rate.

Referring now to FIG. 1, the fuel delivery system 10 of the first embodiment is shown as having a saddle fuel tank 11 mounted in a vehicle body, not shown, which straddles a propeller shaft S extending in a fore and aft direction of the vehicle body at a central area of a vehicular widthwise direction, and a fuel pump 12 adapted to supply fuel from the fuel tank 11 to an internal combustion engine which is not shown.

The saddle tank 11 is formed with a primary tank portion 11a and a secondary tank portion 11b, which straddle the propeller shaft and serve as a primary fuel sump and a secondary fuel sump, respectively, and a concave portion 11c with a reversed concave shape in cross section between the primary and secondary fuel tank portions 11a, 11b.

Accordingly, as fuel in the tank 11 decreases in volume to a lower level than a bottom of the concave portion 11c, the primary and secondary tank portions 11b, 11c being mutually separated from one another.

The fuel pump 12 is contained in the primary tank portion 11a and draws fuel from the primary tank portion 11a whereupon fuel is supplied exteriorly of the fuel tank 11 to the internal combustion engine, not shown, via a primary fuel passage 13, while having a capability of conveniently transferring fuel from the secondary tank portion 11b to the primary tank portion 11a via a first transfer passage 14.

The fuel pump 12 has a variable volume type structure, that can vary a discharge rate of fuel in dependence on a demanded fuel flow rate of the internal combustion engine, and serves to supply fuel, whose impurities are removed with a fuel filter 12a, to the internal combustion engine.

Further, contained in the primary fuel tank portion 11a is a turning reservoir 15 that precludes fuel from escaping toward one side due to a centrifugal force occurring when the motor vehicle encounters a cornering motion, with the fuel pump 12 being mounted in the turning reservoir 15.

As a consequence, an inner space of the primary tank portion 11a is also separated from the turning reservoir 15, with the turning reservoir 15 being able to be referred to as a first fuel sump portion while a turning reservoir exterior chamber 15 formed inside the primary tank section 11a can be referred to as a second fuel sump portion.

Thus, fuel remaining in a turning reservoir outer chamber 11d is conveniently supplied to the turning reservoir 15 via a second transfer passage 16. Also, it is arranged such that the first transfer passage 14 has a fuel discharge port (corresponding to an end portion near the primary tank portion 11a) 14a similarly extending to the turning reservoir 15 at the inside thereof.

The fuel discharge port 14a of the first transfer passage 14 and a fuel discharge port 16a of the second transfer passage 16 are connected to a first jet pump 17 and a second jet pump 18, respectively, which serve as transfer pumps, respectively.

The first jet pump 17 transfers fuel from the secondary tank portion 11b to the turning reservoir 15, to which fuel remaining in the turning reservoir exterior chamber 11d is also transferred.

A divergent fuel passage 19 is diverged from the primary fuel passage 13 and connected to the first and second jet pumps 17, 18, permitting a portion of fuel, to be supplied to the internal combustion engine, to be introduced into the first and second jet pumps 17, 18 which are consequently driven with a traveling energy of a divergent flow of fuel.

That is, the first and second jet pumps 17, 18 each creates a pressure drop due to an ejector action caused by a flow (which creates traveling energy) of fluid (divergent flow of fuel) across a constricted portion, with the pressure drops acting on the first and second transfer passages 14, 16 to draw fuel from the secondary tank portion 11b and the turning reservoir outer chamber 11d to be supplied to the turning reservoir 15.

Also, a check valve 19a is disposed in the divergent fuel passage 19 to avoid reverse flow of fuel to the primary fuel passage 13.

With the structure of the first embodiment, a divergent section 13a between the primary fuel passage 13 and the divergent fuel passage 19 includes a venturi 20 adapted to decrease the flow rate of divergent fuel in accordance with an increase in the demanded fuel flow rate of the internal combustion engine.

As shown in FIG. 2, the venturi 20 has a structure which is comprised of a smoothly shaped constricted portion 23 formed between an inlet 21 of fuel and an outlet 22, causing fuel introduced from the inlet 21 to flow at an increased flow rate at the constricted portion 23.

And, connected to the maximum constricted portion (venturi portion) 23a of the constricted portion 23 is the divergent fuel passage 19 of which the flow rate of divergent fuel is controlled in dependence on the pressure drop created at the constricted portion 23.

With such a structure set forth above, the fuel supply system with the transfer pump of the presently filed embodiment is operative to drive the fuel pump 12 during operation of the internal combustion engine to feed fuel under pressure from the turning reservoir 15 to the primary fuel passage 13 from which fuel is subsequently delivered to the internal combustion engine.

When this takes place, fuel drawn to the primary fuel passage 13 under pressure flows through the venturi 20 to the internal combustion engine, permitting the portion of fuel, passing through the venturi 20, to be diverged to the diverged fuel passage 19 to cause diverged fuel to be supplied through the check valve 19a to the first jet pump 17 and the second jet pump 18 which in turn are driven.

When the first and second jet pumps 17, 18 are driven, fuel remaining in the secondary tank portion 11b to be transferred to the turning reservoir 15 via the first transfer passage 14 while allowing fuel remaining in the turning reservoir exterior chamber 11d to be transferred to the turning reservoir 15 via the second transfer passage 16.

In the meantime, with the presently filed embodiment, since a divergent fuel flow control unit is comprised of the venturi 20 that has the maximum constricted portion 23a of the constricted portion 23 formed in fluid communication with the divergent fuel passage 19, the larger the flow rate of fuel passing through the venturi 20, i.e. the larger the discharge rate of the fuel pump 12, the lower will be the static pressure due to an increased flow speed of fuel across the constricted portion 23 resulting in a decrease in the flow rate of fuel to be diverged to the divergent fuel passage 19.

That is, this means that a Bernoulli theorem is applied to fluid passing through the venturi 20. As shown in a theoretical view of the venturi 20 shown in FIG. 3, assuming that the pressure of fuel passing through the inlet 21 is represented at $P_1$, the speed is represented at $v_1$, the pressure (venturi pressure) of fuel passing through the maximum constricted portion 23a is represented at $P_2$ and the speed is represented at $v_2$, a formula is given by $$P_1/\rho + v_1^2/2 = P_2/\rho + v_2^2/2 \quad \text{①}$$

In such a case, also, since less potential energy exists at an extent that can be ignored, the presence of the potential energy is not taken into consideration.

CALCULATION EXAMPLE 1

Hereinafter, calculation is made for the pressure $P_2$ of the maximum constricted portion 23a in a case where the inlet 21 (cross section A) of the venturi 20 has a diameter of 10ϕ, the maximum constricted portion 23a (cross section B) has a diameter of 5ϕ whereas the fuel pump 12 has a discharge pressure of 400 (kPa) and a discharge rate Q of 170 (L/h).

During such operation, calculation is made under a condition where the cross section of 10ϕ is 0.7854 (cm²) and the cross section of 5ϕ is 0.1963 (cm²) and where the fuel discharge rate Q is converted as 170 (L/h)=47.222 (cm³/s).

On the other hand, $$v_1 = Q/A = 47.222/0.7854$$
$$= 60.125 \text{ (cm/s)}$$
$$v_2 = Q/B = 47.222/0.1963$$
$$= 240.5 \text{ (cm/s)}$$

where conversion is made for P1=400 (kPa)=4000 (kg·cm/s²/cm²) and where a density is expressed as ρ=0.001 (kg/cm³), the above equation ① is expressed as $$4000/0.001 + 60.125^2/2 = P_2/0.001 + 240.5^2/2$$

From this equation, the venturi pressure $P_2$ is determined as $$P_2 = 3972.89 \text{ (kg·cm/s}^2\text{/cm}^2\text{)}$$
$$= 397.29 \text{ (kPa)}$$

CALCULATION EXAMPLE 2

Obtaining the venturi pressure $P_2$ with a condition where the maximum constricted portion 23a (cross section B) of the venturi 20 has a diameter of 2 ϕ, the venturi pressure $P_2$ is determined, by executing calculation in the same manner as the Calculation Example 1, in a formula given by $$P_2 = 287.21 \text{ (kPa)}$$

Also, the above Calculation Example 2 is performed under the same condition as that of the Calculation Example 1 previously described above, where the inlet 21 has the cross section A, the fuel discharge rate is Q, the discharge pressure is $P_1$ and the density is ϕ.

Calculation Results

Calculation results with a plurality of venturi devices 20 whose maximum constricted portions 23a (cross section B) have varying diameters of 10 ϕ, 7.5 ϕ, 5 ϕ, 2.5 ϕ, 2 ϕ, 1.5ϕ and 1, respectively, are plotted in graphs of FIGS. 4 and 5. It is to be noted here that, in any case, the inlet 21 (cross section A) is fixed at a value of 10 ϕ.

FIG. 4 is a characteristic view in which the fuel discharge pressure $P_1$ is plotted on the abscissa axis and the venturi pressure $P_2$ is plotted on the ordinate axis. In FIG. 4, although a characteristic T1 represents cases where there are substantially no variations in the venturi pressure $P_2$ for the cross sections B in diameters of 10 ϕ, 7.5ϕ and 5ϕ, it is understood that the venturi pressure P2 remarkably decreases as the diameter of the constricted portion decreases in a sequence as indicated by a characteristic T2 indicative of the diameter of 2.5ϕ, a characteristic T3 indicative of the diameter of 2ϕ and a characteristic T4 indicative of the diameter of 1.5ϕ. Also, a characteristic indicative of the diameter of 1ϕ is omitted in the figure.

FIG. 5 is a characteristic view in which the fuel discharge flow rate Q is plotted on the abscissa axis and the venturi pressure $P_2$ is plotted on the ordinate axis. In FIG. 5, although a characteristic t1 represents cases where there are substantially no variations in the venturi pressure $P_2$ for the cross sections B having diameters of 10 ϕ, 7.5ϕ and 5ϕ, it is understood that the venturi pressure $P_2$ remarkably decreases, at increased reduction rates as the diameter of the constricted portion decreases in a sequence as indicated by a characteristic t2 indicative of the diameter of 2.5ϕ, a characteristic t3 indicative of the diameter of 2ϕ and a characteristic t4 indicative of the diameter of 1.5ϕ.

That is, the presence of the increased reduction rates of the venturi pressures $P_2$ is reflected in a remarkable decrease in the flow rate of fuel to be diverged to the divergent fuel passage 19 held in fluid communication with the maximum constricted portion 23a.

Accordingly, the flow rate of fuel driving the first and second jet pumps 17, 18 can be decreased in accordance with the increase in the demanded fuel flow rate of the internal combustion engine, i.e. the increase in the discharge flow rate Q of the fuel pump 12, it is possible for a compensation flow rate of the fuel pump 12 as a whole to be decreased, with a resultant decrease in the compensation flow rate to enable reduction in the flow rate size of the fuel pump.

That is, this results in a reduction in electric power consumption of the fuel pump 12 to provide an improved fuel economy, while enabling reduction in a drive power of the fuel pump 12 to thereby improve noise and vibrating performances.

Further, with the structure of the presently filed embodiment, the presence of the venturi 20 disposed at the divergent section 13a between the primary fuel passage and the divergent fuel passage 19 provides an ease of diverging fuel, which passes through the primary fuel passage 13, to the divergent fuel passage 19, with a resultant simplification in structure of the diverged fuel flow control unit.

Further, since divergent fuel control to cause fuel to be diverged to the divergent fuel passage 19 is achieved by a shape of the venturi 20 per se without the need for movable parts, the divergent fuel control unit is able to operate in a highly improved reliability, while having a simplified structure with a reduction in cost.

(Second Embodiment)

Figure 6:
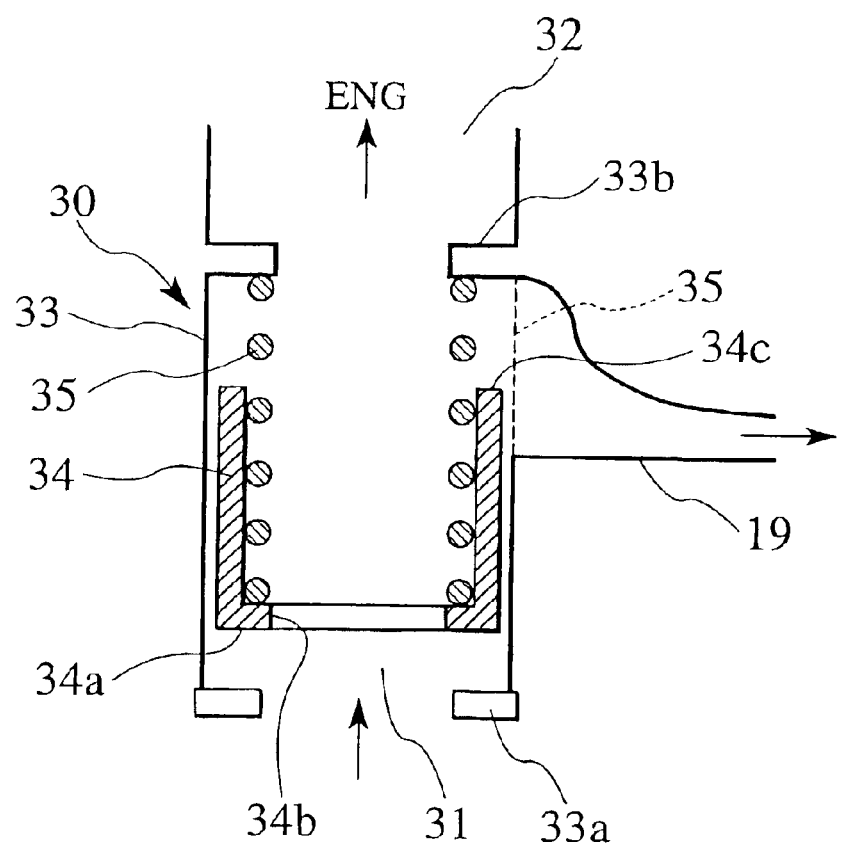
FIG. 6 is an enlarged cross sectional view of a divergent fuel control unit of a second embodiment according to the present invention.

FIG. 6 shows a second embodiment of the present invention, with the same component parts bearing the same reference numerals as those of the first embodiment to omit redundant description. Also, FIG. 6 is an enlarged cross sectional view of a divergent fuel control unit.

A fuel supply system 10 of the second embodiment includes a divergent fuel control unit which is comprised of a movable valve 30, with description being focused hereinafter on the movable valve 30 in conjunction with FIG. 1 which has been previously mentioned.

The movable valve 30 includes a cylinder 33 which has an inlet 31 and an outlet 32 connected to the divergent section 13a of the primary fuel passage 13, a valve body 34 tightly received in the cylinder 33 for sliding movements, and a return spring 35 which urges the valve body 34 in an open direction.

The valve body 34 includes a sleeve shape with a given length which has a bottom 34a formed with a fuel passage opening 34b, and is slidable between a pair of stoppers 33a, 33b formed inside the cylinder 33 and spaced from a larger distance than the length of the valve body 34.

The return spring 35 is disposed in a compressed state between the stopper 33b and the bottom 34a to normally urge the valve body 34 toward the stopper 33a.

The cylinder 33 is formed with an opening portion 35 at a position that enables variation in communication surface area during movements of the valve body 34, i.e. in an area between a distal end 34c of the valve body 34 and the stopper 33b under a condition where the valve body 34 abuts the stopper 33a, with the opening portion 35 being connected to the diverged fuel passage 19 to which the first and second jet pumps 17, 18 are connected.

And, when locating the movable body 34 at the divergent section 13a, the inlet 31 is connected to the primary fuel passage 13 at a position thereof closer to the fuel pump 12, and the outlet 32 is connected to the primary fuel passage 13 at the other end thereof closer to the internal combustion engine.

As a consequence, with the fuel supply system 10 of the presently filed embodiment, when discharged fuel from the fuel pomp 12 reaches the movable valve 30 via the primary fuel passage 13, discharged fuel passes through the fuel passage opening 34b formed at the bottom 34a of the valve body 34 and is supplied into the primary fuel passage 13 at the side closer to the internal combustion engine.

When this takes place, fuel undergoes a resistance during travel across the fuel passage opening 34b and, hence, the valve body 34 is moved against the urging force of the return spring 35.

In the meantime, the larger the discharge rate of the fuel pump 12, the larger will be a resistance of the valve body 34 created by fuel passing therethrough. Therefore, the amount of incremental displacement of the valve body 34 increases as the discharge rate of the fuel pump 12 increases, thereby decreasing the opening surface area of the opening portion 35 held in communication with the primary fuel passage 19.

For this reason, the larger the flow rate of fuel to be supplied with the fuel pump 12, the smaller will be the flow rate of fuel to be diverged to the divergent fuel passage 19, with a resultant decrease in the compensation flow rate of the fuel pump 12 as a whole and in its flow rate size.

Further, since the flow rate of fuel to be diverged is determined with the surface area of communication of the diverged fuel passage 19 that varies depending on the travel of the valve body 34, a control precision of the flow rate of fuel to be diverged can be further improved.

By the way, while the embodiments set forth above have been disclosed with reference to a case where, because of the presence of the turning reservoir 15 disposed in the primary tank portion 11a of the saddle fuel tank 11, the first and second jet pumps 17, 18 are provided to transfer fuels from the secondary tank portion 11b and the turning reservoir outer chamber 11d to the turning reservoir 15, the number of jet pumps is not limited to these two first and second jet pumps 17, 18 and an alternative may include either one of these jet pumps or may include more than three pieces which involve the above two jet pumps with an additional one or further added pieces.

Further, the structure of the tank 11 is not limited to the saddle shape and may be modified to have a structure including only the turning reservoir or a structure in which the tank 11 is of a saddle tank with no turning reservoir 15. In addition, the present invention may be applied to a structure that requires an accommodating region for the fuel pump 12 to be separately formed from another area to cause the accommodating region to be supplied with fuel, regardless of the saddle configuration and the turning reservoir.

Furthermore, while the present invention has been disclosed in conjunction with a case where the jet pumps 17, 18 are used as transfer pumps, the present invention is not limited thereto provided that the pumps are driven through the use of a traveling energy of fluid.

The entire content of a Japanese Application No. P2001-306785 with a filing date of Oct. 2, 2001 is herein incorporated by reference.

Although the invention has been described above by reference to certain embodiments of the invention, the invention is not limited to the embodiments described above will occur to those skilled in the art, in light of the teachings. The scope of the invention is defined with reference to the following claims.

What is claimed is:

1. A fuel supply system with a transfer pump, comprising:
   a fuel pump supplying fuel to an internal combustion engine;
   a fuel tank having a first fuel sump portion in which the fuel pump is disposed and a second fuel sump portion formed separate from the first fuel sump portion;
   a transfer pump driven with a traveling energy of divergent fuel diverged from a portion of fuel to be supplied to the internal combustion engine from the fuel pump to transfer fuel from the second sump portion to the first fuel sump portion; and
   a divergent fuel control unit disposed in a supply line of the divergent fuel to decrease the flow rate of the divergent fuel in dependence on a demanded fuel flow rate of the internal combustion engine.

2. The fuel supply system with a transfer pump according to claim 1, wherein the divergent fuel control unit is disposed at a divergent section between a primary fuel passage, connected from the fuel pump to the internal combustion engine, and a divergent fuel passage diverged from the primary fuel passage and connected to the transfer pump.

3. The fuel supply system with a transfer pump according to claim 2, wherein the divergent fuel control unit is disposed in the primary fuel passage and includes a venturi having a constricted portion in fluid communication with the divergent fuel passage.

4. The fuel supply system with a transfer pump according to claim 2, wherein the divergent fuel control unit is disposed in the primary fuel passage and includes a movable valve which has a valve body movable in dependence on a discharge rate of the fuel pump and which communicates with the divergent fuel passage at a position in which a communication surface area is varied due to movements of the valve body.

5. A fuel supply system with a transfer pump, comprising:
means for supplying fuel to an internal combustion engine;
a fuel tank having first fuel sump means in which the fuel supplying means is disposed and second fuel sump means formed separate from the first fuel sump means;
fuel transfer means driven with a traveling energy of divergent fuel diverged from a portion of fuel to be supplied to the internal combustion engine from the fuel pump to transfer fuel from the second sump portion to the first fuel sump portion; and
divergent fuel control means disposed in a supply line of the divergent fuel to decrease the flow rate of the divergent fuel in dependence on a demanded fuel flow rate of the internal combustion engine.

6. A method for supplying fuel to an internal combustion engine, the method comprising:
preparing a fuel pump supplying fuel to an internal combustion engine through a primary fuel passage;
preparing a fuel tank having a first fuel sump portion in which the fuel pump is disposed and a second fuel sump portion formed separate from the first fuel sump portion;
locating a transfer pump, which is driven with a traveling energy of divergent fuel diverged from a portion of fuel to be supplied to the internal combustion engine from the fuel pump, in a divergent fuel passage connected to the primary fuel passage;
allowing the portion of fuel, passing through the primary fuel passage, to flow into the divergent fuel passage to drive the transfer pump for transferring fuel from the second sump portion to the first fuel sump portion;
controlling the degree of fluid communication between the primary passage and the divergent fuel passage to decrease the flow rate of divergent fuel in dependence on a demanded fuel flow rate of the internal combustion engine.

* * * * *